US012792414B2

(12) United States Patent
Challapally

(10) Patent No.: US 12,792,414 B2
(45) Date of Patent: Nov. 10, 2026

(54) OPPORTUNISTIC MICRO-TRAINING ON EDGE DEVICES USING SPARE GPU UTILIZATION

(71) Applicant: Microsoft Technology Licensing, LLC, Redmond, WA (US)

(72) Inventor: Aditya Vasanth Challapally, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 19/195,047

(22) Filed: Apr. 30, 2025

(65) Prior Publication Data

US 2026/0349820 A1 Nov. 5, 2026

(51) Int. Cl.
*G06F 9/50* (2006.01)
*G06F 9/38* (2018.01)
(Continued)

(52) U.S. Cl.
CPC .......... *G06F 9/5038* (2013.01); *G06F 9/3836* (2013.01); *G06F 9/5061* (2013.01);
(Continued)

(58) Field of Classification Search
CPC .... G06F 9/5038; G06F 9/3836; G06F 9/5061; G06F 2209/5017; G06F 2209/503; G06N 3/08; G06N 3/098
See application file for complete search history.

(56) References Cited

U.S. PATENT DOCUMENTS 12,463,875 B2 * 11/2025 Kumar .................. G06F 9/5094
12,572,842 B2 * 3/2026 Zhu ........................ G06N 20/00
(Continued)

FOREIGN PATENT DOCUMENTS

CN 111444019 A 7/2020
CN 114186237 A 3/2022

OTHER PUBLICATIONS

Xie, et al., "Asynchronous Federated Optimization", Retrieved form: https://arxiv.org/abs/1903.03934, Dec. 5, 2020, 11 Pages.

*Primary Examiner* — Shawn Doman
(74) *Attorney, Agent, or Firm* — Schwegman Lundberg & Woessner, P.A.

(57) ABSTRACT

A system and method for leveraging spare GPU capacity on edge devices through opportunistic micro-training of machine learning models. The system monitors edge devices to detect available compute capacity and decomposes training tasks into independently trainable micro-tasks by analyzing model dependencies and identifying optimal split points based on communication cost, memory overhead, and data locality. Micro-task size is dynamically adjusted based on device capabilities and historical availability patterns before distribution to edge devices for execution during periods of spare capacity. The system implements Byzantine-resistant validation protocols and asynchronous result aggregation, where model updates are weighted based on result trustworthiness, staleness, and device reliability scores. This approach enables effective utilization of transient computational resources while maintaining zero impact on device primary functions, ensuring computation integrity, and preserving model convergence.

20 Claims, 4 Drawing Sheets

(51) Int. Cl.
*G06N 3/08* (2023.01)
*G06N 3/098* (2023.01)

(52) U.S. Cl.
CPC ............... *G06N 3/08* (2013.01); *G06N 3/098* (2023.01); *G06F 2209/5017* (2013.01); *G06F 2209/503* (2013.01)

(56) References Cited

U.S. PATENT DOCUMENTS

| | | | | |
|---|---|---|---|---|
| 2019/0258523 | A1* | 8/2019 | Tappeiner | G06F 9/5083 |
| 2022/0092479 | A1* | 3/2022 | Shin | G06N 20/00 |
| 2022/0374713 | A1* | 11/2022 | Wu | G06N 3/063 |
| 2023/0185622 | A1* | 6/2023 | Saxena | G06Q 40/06 718/104 |
| 2023/0342618 | A1 | 10/2023 | Yogesh | |
| 2024/0256973 | A1* | 8/2024 | Vandikas | G06N 20/00 |
| 2025/0165301 | A1* | 5/2025 | Vegiraju | G06F 9/5066 |

* cited by examiner

OPPORTUNISTIC MICRO-TRAINING ON EDGE DEVICES USING SPARE GPU UTILIZATION

TECHNICAL FIELD

Embodiments pertain to machine-learning model training. Some embodiments relate to distributed machine-learning model training.

BACKGROUND

Machine learning is a field of computer science focused on developing systems that can learn and improve from experience without being explicitly programmed. Machine learning models are used across a wide range of applications, including image and speech recognition, natural language processing, recommendation systems, and autonomous vehicles. Machine learning involves training computational models on large datasets to recognize patterns and make predictions or decisions. These models are typically implemented as neural networks-complex mathematical structures composed of interconnected layers of computational units that process and transform input data to generate outputs.

Training machine learning models requires significant computational resources as the model must repeatedly process large amounts of data to adjust its internal parameters and improve its performance. This training process involves computing gradients-mathematical measurements of how changes to the model's parameters affect its performance-and using these gradients to incrementally update the model's behavior.

Modern machine learning models often utilize Graphics Processing Units (GPUs) for training, as these specialized processors are particularly well-suited for the parallel mathematical computations required. The training process typically involves both forward computations, where data flows through the network to generate predictions, and backward computations (backpropagation), where gradients are calculated to update the model's parameters.

Common machine learning architectures include convolutional neural networks (CNNs), which are particularly effective for processing visual data, and transformer models, which excel at processing sequential data like text. These different architectures may employ various optimization techniques during training, such as momentum-based methods or adaptive learning rates, to improve training efficiency and model performance.

The training process often involves multiple phases and techniques, including batch processing, where the model processes multiple data samples simultaneously, and various forms of regularization to prevent overfitting and improve generalization. As models become more sophisticated, they may incorporate advanced features like attention mechanisms and skip connections to enhance their learning capabilities.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
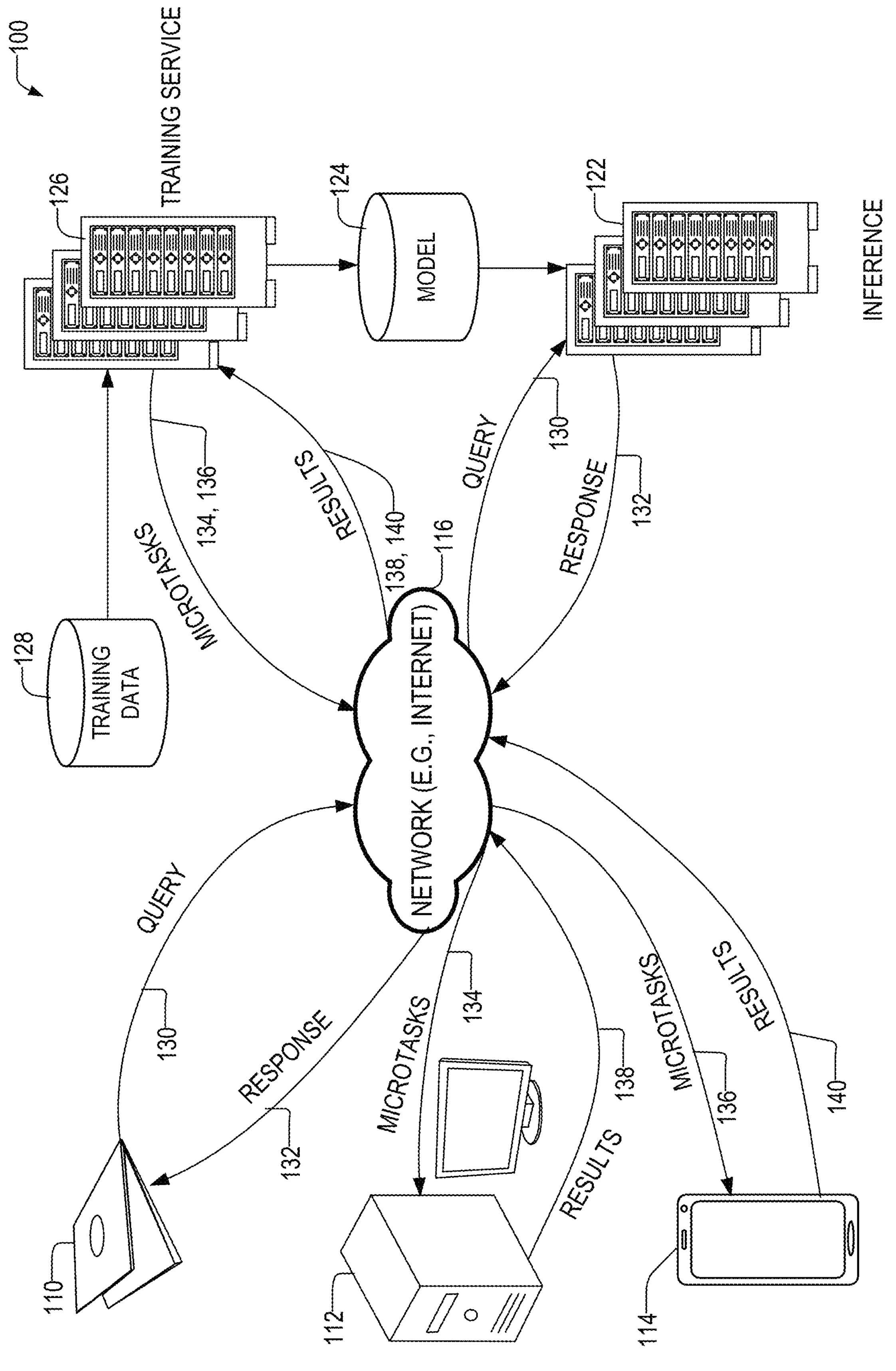
FIG. 1 illustrates a machine-learning training and inference system that integrates distributed edge training, according to some examples of the present disclosure.

Current training systems are built around the assumption of having dedicated computational resources available. Due to the increasing complexity and size of modern machine learning models, this has created an enormous demand for GPUs during the training process. In addition to being expensive and consuming an enormous amount of resources, the demand for GPUs has led to shortages.

On the other hand, vast amounts of unused processing power exist on edge devices like smartphones and gaming computers-processing power that often sits idle for significant periods of time. For example, gaming computers often feature powerful GPUs that are largely unused when not playing games. As used herein, the term "edge devices" refers to network-connected computing devices equipped with graphics processing units (GPUs), including smartphones, laptops, and Internet of Things (IoT) devices, that have computational resources available during idle or low-utilization periods. These edge devices are characterized by having limited memory and computational capacity (when compared to traditional data centers) and are typically not owned or controlled by the entity seeking to utilize their computational capabilities. The edge devices may include mobile devices, tablets, laptops, desktops such as gaming computers, and the like that can provide compute capacity during idle periods, wherein the compute capabilities of such devices can be leveraged opportunistically while maintaining zero impact on the device's primary functions and user experience.

The inability to leverage this spare GPU capacity represents a significant missed opportunity. Edge devices with capable GPUs or CPUs are ubiquitous, but their computational power goes unused when the devices are charging, idle, or only partially utilizing their computational capabilities. Traditional training approaches cannot tap into this potential computational resource because they lack the ability to handle unpredictable resource availability and maintain training integrity across untrusted devices. Additionally, current training approaches would negatively impact the primary functions of the host devices, degrading performance for critical tasks like gaming or mobile applications. Furthermore, without robust mechanisms for verifying the correctness of computations performed on arbitrary devices, maintaining reliable training progress becomes extremely difficult. The synchronization requirements of current approaches create additional barriers, as devices must coordinate their computations through rigid synchronization points rather than contributing processing power opportunistically.

Disclosed in some examples are methods, systems, devices, and machine-readable mediums for leveraging spare compute capacity on edge devices to train machine learning models through opportunistic micro-training. The invention works by monitoring edge devices for available compute capacity, intelligently decomposing neural network training tasks into independently trainable micro-tasks based on optimal split points in the network, distributing these micro-tasks to devices when they have spare capacity, and then aggregating the results using a sophisticated weighting system that accounts for result trustworthiness, staleness, and device reliability-all while ensuring the user experience on these devices remains mostly unaffected using adaptive sampling of device usage.

The system utilizes a monitoring framework that tracks compute availability and performance metrics across connected edge devices without impacting their primary functions. This monitoring system employs adaptive analysis of usage patterns, thermal constraints, and device states to predict windows of computational availability. A periodicity of the device information collection changes based upon edge device utilization parameters, such as processing utilization and temperature of the device. By adapting the collection periodicity, the system may avoid overly burdening the edge device with device utilization metrics collection during times of peak usage to ensure the edge device user experience is not degraded. In some examples, the system preserves edge device performance by using resource management policies. Example resource management policies include limiting memory allocation used by micro-tasks to a percentage of available capacity, and bounding compute utilization by utilizing thermal constraints to ensure device safety and prevent interference with host device operations.

The system assigns edge devices with spare compute ability one or more microtasks. The system breaks down large machine learning training operations into micro-tasks by using structural analysis of the machine-learning model parameters. The system utilizes a layer-wise partitioning where structural analysis of the machine-learning model reveals calculation dependencies. The system uses the identified dependencies to schedule training operations such that operations that are not dependent upon each other may be executed in parallel, but operations that are dependent upon a second operation are performed after the second operation. In addition to structural (layer-wise) decomposition, the system may also partition training updates by gradient segments, which enables training of subsets of parameter updates (e.g., per-layer gradients or gradient blocks) independently, which are later reassembled with weighted aggregation.

To ensure computation integrity across untrusted devices, the system implements a Byzantine-resistant validation protocol that may require multiple independent verifications before accepting any computation result. The system combines statistical analysis and consensus mechanisms to maintain reliable training despite unpredictable device availability. The system maintains model convergence through an asynchronous result aggregation mechanism that can handle updates from different devices arriving at unpredictable times and updates that do not cleanly align with model structural boundaries. This includes adaptive learning rate scheduling, momentum tracking, and staleness penalties to ensure stable training progress despite the irregular nature of contributions from edge devices.

The edge devices used may be third party devices that are not owned by the entity training the model, but who have given their express authorization to utilize the computing device to train the models. In some examples, the system may track the amount of computations each edge device has provided and may compensate the owners of the edge devices. For example, each computation may result in a credit being applied to an owner's account. The credits may be exchanged for free software, model access credits allow the user to access the model being trained, money, or the like.

The present disclosure thus addresses the technical problem of obtaining enough computing resources to train machine-learning models. This is solved using the technical solutions described herein for utilizing idle computing resources on edge devices that may or may not be owned by the entity training the model. Traditional model learning architectures require dedicated resources and fixed scheduling preventing them from effectively utilizing the vast amount of processing power that sits idle on edge devices. For example, these systems do not allow for leveraging brief or unpredictable periods of GPU availability, lack mechanisms for ensuring computation integrity across untrusted devices, may negatively impact the primary functions of host devices. The technical solution described herein implements an opportunistic micro-training system that decomposes machine learning models into independently trainable components through a combination of layer-wise partitioning and gradient-based decomposition. The system employs sophisticated monitoring that tracks GPU availability without impacting device performance, Byzantine-resistant validation protocols to ensure computation integrity, and asynchronous result aggregation to maintain model convergence despite irregular update patterns. This solution enables efficient utilization of spare GPU capacity while preserving device performance through careful resource management, including capped memory allocation and thermal-aware scheduling. The system's decomposition framework maintains mathematical correctness through specialized handling of optimization dynamics and gradient computations, ensuring reliable training despite the distributed and opportunistic nature of the processing. The technical effect is the use of available, but yet unused resources on edge devices, thus requiring less dedicated hardware for machine-learning training and overall a reduction in resources used.

In some examples, the system may be conceptually broken into three separate components that enable distributed machine learning on edge devices. A person of ordinary skill in the art will understand that the techniques of each of the components may be used together, or separately and that inventive concepts may be found in any one or more of the components. A task decomposition component breaks down large machine learning training tasks into independently trainable micro-tasks. Second, task assignment and resource management aspects both monitor and optimize operation of the system by continuously tracking GPU availability, implementing resource constraints, and distributing micro-tasks based on device capabilities and predicted availability windows. Third, result validation and aggregation aspects ensure computation integrity through Byzantine-resistant protocols that may utilize multiple independent verifications and which combine validated results through sophisticated weighted averaging and momentum tracking mechanisms while maintaining model convergence despite the irregular nature of updates from edge devices. Each aspect will be explored in detail in turn.

Microtask Creation

The system breaks down training tasks into microtasks by first finding places where training tasks may be split and still maintain mathematical coherence to allow the system to incorporate the results back into the training phase. These microtasks are specific units of work or calculations that can be executed on an edge device independently of other microtasks.

To create these microtasks, the system first creates a dependency graph of all the different parts of the machine-learning model and how they depend on each other. A dependency graph represents the relationships between variables, features, or internal components (neurons) of the model. Nodes represent variables, features, data points, or internal model components such as neurons or layers. Edges may represent the dependencies or relationships between nodes showing which calculations must happen before others can proceed. Edges may be directed or undirected. Examples of dependency graphs include neuron dependency graphs (NDGs) that are generated by analyzing the logical dependencies between neurons in a selected layer of a neural network. This is accomplished by sampling data points and evaluating activation patterns of neurons, applying logical or probabilistic rules to determine whether the activation of one neuron depends on another, and building a directed graph where nodes represent neurons and edges represent discovered dependencies.

In some examples the dependency graph of the machine-learning model may be created by first identifying a plurality of model components, each corresponding to a computational layer within the machine-learning model. Next, the system may determine, for each model component, one or more input dependencies and one or more output dependencies based on computational requirements. Third, the system may generate nodes in the dependency graph corresponding to the identified plurality of model components. Finally, the system may generate directed edges between nodes in the dependency graph to represent the computational dependencies between the corresponding model components, such that an edge from a first node to a second node indicates that an output of the first node is used as an input to the second node.

For transformer models, the system analyzes the attention computation stack, examining how key, query, and value projections interact during both forward and backward passes to determine whether these components should be kept together in a single partition or can be separated. For position encodings in transformers, the system uses handling to maintain proper context across partition boundaries, analyzing how position information flows through the network and affects attention computations at different scales to ensure partitioning doesn't disrupt the transformer's ability to capture sequential relationships. When dealing with convolutional architectures, the system performs receptive field analysis that considers how different kernel sizes affect spatial relationships, the impact of stride patterns on feature maps, effects of dilation factors, spatial and channel-wise dependencies, how feature maps contribute to outputs, and how gradients flow back through the network. The system includes handling for skip connections and residual pathways to maintain proper information flow, analyzing how different types of skip connections affect both forward computation and gradient propagation to ensure that important residual information continues to flow properly through the network after partitioning.

Once the dependency graph is created, the system may identify a plurality of potential training task split points based upon points in the dependency graph where the calculations within each same split point are not dependent on the other calculations within each same split point.

To further refine these potential split points, the system looks at every connection between layers and calculates a cost. This cost considers how much communication, memory, and data movement would be needed if the tasks were split at that point. One example formula may be:

$$A\_cost(p)=\lambda\_c\times C\_comm(p)+\lambda\_m\times M\_overhead(p)+\lambda\_d\times D\_locality(p)$$

where: A_cost(p) is the total cost of splitting at point p

C_comm(p) is the communication cost (e.g., a cost of repeating calculations between devices);

M_overhead(p) is the memory overhead (e.g., a cost of storing outputs from earlier layers);

D_locality(p) is how splitting affects data locality;

λ_c, λ_m, λ_d are weights that adjust how much each factor matters.

By calculating this cost at every connection, the system can find the optimal split points, which are places where the cost is lowest.

C_comm(p) may be calculated by counting how many bytes of data need to be sent between devices when the system splits at point p, then multiplied by how slow the network is.

M_overhead(p) may be calculated by measuring how much extra memory is needed to store temporary results at the split point compared to normal operation. This includes both the neural network's intermediate outputs and the data needed to update the model.

D_locality(p) may be calculated by analyzing how often the computation needs to access data that isn't stored locally after splitting. When data is far from where it's needed, this value increases, making the split less desirable.

For λ_c, λ_m, λ_d: These importance weights may start at specified values (e.g., 0.5, 0.3, and 0.2 respectively) and then may be adjusted automatically over time based on real-world performance measurements to optimize for different network conditions and device types.

In some examples, for each potential split, the system ensures that the network behavior is not affected using this formula: $Split\_Error(c)=\|F(x)-F'(x)\|_2\leq 0.000001$. This measures the difference between how the original network behaves (F(x)) and how the split version behaves (F'(x)). The difference needs to be less than a threshold distance, such as less than one millionth, for the split to be acceptable.

Microtask Adjustments

The system may adjust the size of each micro-task based on the device that might run it based upon the formula:

$$TaskSize=base\_size\times e\hat{}(-\lambda\times V)\times C$$

where:

base_size is a starting reference size;

λ is how quickly the size adapts based upon the other factors (between 0.1 and 0.5);

V is a measure of how unpredictably the device becomes available;

C is the device's capability factor.

In some examples, V may be calculated by tracking when a device is available for computation over the last 24 hours and measuring how irregular these periods are. A standard deviation may be used to capture this variability. The standard deviation may then be scaled to a 0-1 range, where 0 means perfectly predictable (like a device that's available every day from 2-4 μm) and 1 means completely random. For new devices without much history, V may start at a prespecified value (e.g., V=0.7) and then it may be refined as the system collects more data. This approach lets the system create appropriately sized tasks-smaller ones for unpredictable devices and larger ones for devices with consistent availability patterns.

This capability factor combines multiple characteristics $C=w_1\times(\text{compute\_power/reference})+w_2\times(\text{memory/reference})+w_3\times(\text{reliability})+w_4\times(\text{thermal\_headroom/reference})$ The capability factor thus is a weighted combination of normalized computing power, memory sizes, and thermal headroom as compared to reference values. In some examples, the compute power calculate this by measuring the device's performance on standardized benchmarks (like FLOPS for neural network operations) and dividing by the performance of a reference system. For example, if a reference device processes 100 GFLOPS and the edge device processes 150 GFLOPS, the normalized value would be 1.5. This normalization allows the system to handle heterogeneous devices with widely different capabilities—from powerful gaming PCs to modest smartphones—using a consistent scale. The reference device, in some examples, may be set to a mid-range GPU that represents a baseline expectation for participation in the distributed training system. Similarly, the memory/reference and thermal_headroom/reference terms normalize those capabilities against the same reference device to maintain consistency across all measurements in the equation.

Reliability may be calculated as a rolling score based on the device's recent performance across a specified number of tasks (e.g., the last 100 tasks). Each time a device successfully completes a task, it earns a score of 1.0. In some examples, success may be measured based upon a validation framework that combines: 1.) an agreement check where the device's result is compared with what other devices calculated for the same task (higher similarity means higher agreement); (40) 2.) A math check (30% of the score) where the mathematical properties are verified as correct—e.g., ensuring gradients have reasonable magnitudes and tensor properties are preserved; and 3.) a range check (30% of the score) where the system confirms the values fall within expected boundaries based on historical data. In some examples each of the checks may be weighted and summed. For example, 0.40 on the agreement check, 0.30 on the math check and 0.30 on the mathematical property check. In these examples, a successful computation scores above a threshold score (e.g., 0.8). Results falling below a second threshold (e.g., 0.5) are considered unsuccessful.

When it fails (by timing out, returning incorrect results, or disconnecting), it scores 0.0. The system may use an exponentially weighted moving average that gives more importance to recent performance. New devices may start with a baseline reliability (e.g., 0.8 to give them the benefit of the doubt), then this score adjusts with experience.

The reliability score drops more significantly when a device returns suspicious results that fail validation checks. For example, if a device consistently produces outlier results that differ significantly from consensus, its reliability might drop by a larger amount (e.g., 0.05 instead of the standard 0.01) than for a simple failure.

As can be appreciated, powerful devices with good cooling and reliability get larger and/or more tasks.

Device Monitoring and Optimization

The system monitors devices to identify when each of the devices has computational resources available. The system avoids disrupting the user experience such as by slowing down applications, draining batteries, or making devices overheat. Its goal is to utilize spare capacity that would otherwise be wasted.

The monitoring system tracks a number of device utilization metrics for the edge devices, such as:

GPU and/or CPU utilization (percentage of compute units active);

Memory usage (current and peak allocation);

Temperature (core and memory temperatures);

Power consumption;

Memory bandwidth;

Compute queue depth;

The system may adjust how often it checks these metrics to avoid disturbing the edge device and reducing the quality of the end-user experiences on these devices based on current conditions. It samples the devices periodically at a sample rate that may be determined by:

$$\text{Sample\_Rate}=\min(100\text{ ms},\max(5\text{ ms},\beta\times U\times T\_\text{factor}))$$

Where:

β is a scaling factor (e.g., 0.1-0.3);

U is current compute (e.g., GPU) utilization;

T_factor adjusts based on temperature.

As can be appreciated, the sample rate is adjusted so that the system checks less frequently when the GPU is busy or hot and more frequently when the GPU is idle and/or the system is cool. This reduces overhead and avoid interfering with the device's primary functions (like gaming or other user applications). Frequent sampling during high utilization could create additional load that degrades user experience.

In addition to general availability detection using the adaptive sampling above, during active microtask execution, the system may utilize a separate, dedicated monitoring channel that uses lightweight performance counters and temperature sensors. If the performance counters and/or temperature sensors cross a threshold, than the micro-task may be paused, stopped, or cancelled. This provides continuous oversight without significant performance impact.

The system uses one or more of the above metrics to predict future GPU availability using a combination of methods. In particular, by utilizing one or more of: a neural network prediction based upon historical patterns, a Bayesian probabilistic forecast, or a long-term trend analysis. In some examples, these approaches may be combined using a formula such as:

$$P(t)=0.6\times\text{LSTM}(H)+0.3\times\text{Bayesian}(R)+0.1\times\text{Statistical}(T)$$

Where:

LSTM(H) is a neural network prediction based on historical patterns of device utilization metrics;

Bayesian(R) is a probabilistic forecast based upon the device utilization metrics;

Statistical(T) provides long-term trend analysis based upon the device utilization metrics.

P(t) gives a prediction of availability at time t that may be used to assign tasks. The predictions of all the edge devices may allow the system to schedule micro-tasks for each edge device in advance.

In some examples, the system may also predict how device temperature will change, such as using the formula:

$$T\_\text{future}=T\_\text{current}+\Delta T\_\text{compute}+\Delta T\_\text{ambient}-\Delta T\_\text{cooling}$$

where:

T_future is the future predicted temperature;

T_current is the current temperature of the device.

ΔT_compute is the expected temperature increase from running the computational workload. This represents how much heat will be generated by the GPU/CPU when processing the assigned microtask, calculated based on the workload intensity and device-specific thermal characteristics.

ΔT_ambient is the predicted change in surrounding environmental temperature during the computation period. This accounts for external factors like room temperature fluctuations, time of day temperature patterns, or seasonal changes that might affect the device independently.

ΔT_cooling is the estimated cooling effect provided by the device's thermal management systems. This includes passive heat dissipation through the device's materials and active cooling mechanisms like fans, calculated based on the temperature differential between the device and its environment and the efficiency of its cooling architecture.

Based upon the temperature of the device, the system may also utilize safety thresholds that prevent the device from overheating. That is, the number of micro-tasks that are assigned to a device may be modified or executing micro-tasks may be paused to prevent overheating.

For devices that are both predicted to have availability using P(t) from above, and are within the temperature boundaries given above, the system will assign tasks to that device. In order to select a task, the system calculates a priority score for a specific (device, task) tuple using the formula:

$$\text{Priority\_Score}(\text{device } d, \text{task } t)=\alpha_1\times U+\alpha_2\times P+\alpha_3\times R+\alpha_4\times T$$

Where:

U is device d utilization;

P is task t priority;

R is device d reliability;

T is thermal headroom of device d;

$\alpha_1$, $\alpha_2$, $\alpha_3$, $\alpha_4$ are weights that adapt based on system conditions.

The above formula may be used to decide which device should handle which task. It measures how good a match they are together, not just how good the device is or how important the task is separately. It helps the system match the right task with the right device at the right time. The system looks at both what the device can handle right now (how busy it is and how hot it is) and how important the task is. This allows the system to use the available computing power efficiently while making sure devices are not overloaded.

U (device utilization) is measured as an inverse percentage of current resource usage based upon the device utilization metrics. For example, U=1−(current_usage/max_capacity). This is calculated as a weighted combination of GPU utilization, memory usage, and compute queue depth. A completely idle device would have U=1.0, while a fully utilized device would have U=0.

P (task priority) ranges from 0.1 to 1.0 and reflects the importance of the microtask to the overall training process. Critical gradient updates for frequently accessed model components receive higher priorities (0.8-1.0), while supplementary training tasks receive lower priorities (0.1-0.4).

R (device reliability) is the historical performance score (discussed more later), ranging from 0 to 1.0, based on successful completions and result quality.

T (thermal headroom) is calculated as (max_safe_temp−current_temp)/(max_safe_temp−min_operating_temp), giving a normalized value between 0 and 1, where higher values indicate more available cooling capacity.

The weights ($\alpha_1$, $\alpha_2$, $\alpha_3$, $\alpha_4$) may start at baseline values (e.g., such as 0.4, 0.3, 0.2, and 0.1 respectively), but may be automatically adjusted based on system-wide performance metrics. For instance, if thermal issues become prevalent across the network, $\alpha_4$ would increase to place greater emphasis on thermal headroom.

The system allocates memory carefully to avoid impacting the device's main functions:

$$\text{Memory\_Allocation}=\min(0.8\times\text{Total\_Memory},\text{Available\_Memory}-\text{Safety\_Buffer})$$

Where:

$$\text{Safety\_Buffer}=\max(512\text{ MB},0.15\times\text{Peak\_Usage\_History},\gamma\times\text{Temperature\_Factor}).$$

The memory allocation formula is used to determine the number of microtasks assigned to a device. After calculating the Priority_Score to determine which devices should receive tasks, the system uses the Memory_Allocation formula to determine the number of tasks to assign to each device. The system calculates the total memory budget available for microtasks using the Memory_Allocation formula. The system then divides this budget by the estimated memory footprint of each microtask type to determine the maximum number of concurrent tasks the device can safely handle. For example, if Memory_Allocation determines 2 GB is available and each microtask requires approximately 256 MB, the system may assign up to 8 microtasks to that device (assuming other resources like compute aren't constraining factors). The system does not control the memory on the device, however, this formula is used as a self-imposed limit. Before accepting new microtasks, the system checks if the required memory would exceed the calculated safe threshold. If it would, the system declines additional tasks until resources free up. In this context, the Temperature_Factor component ensures that as a device heats up, the Safety_Buffer increases, reducing available memory for our tasks.

Result Aggregation

Since these calculations happen across many different devices at unpredictable times, the system needs to combine all the results. In some examples, each result comes tagged with information about which specific piece of the model it belongs to, when it was calculated, which device calculated it, a cryptographic signature to prove it wasn't tampered with.

The system updates the model using this equation:

$$\theta(t+1)=\theta(t)+\eta(t)\times\Sigma(w_i\times\Delta\theta_i)$$

where:

θ(t) are the current model parameters;

θ(t+1) are the updated parameters;

η(t) is an adaptive learning rate;

$w_i$ is the weight for each update;

$\Delta\theta_i$ is the parameter change from each device.

The learning rate adapts over time according to:

$$\eta(t)=\text{base\_lr}\times e\hat{\ }(-\gamma t)\times M(t)\times S(t)$$

where:

base_lr is the starting learning rate (e.g., typically 0.01);

γ is a decay factor (e.g., 0.001);

M(t) accounts for momentum;

S(t) adjusts based on how stale updates are.

The staleness factor S(t) measures how "fresh" or "old" an update is using this formula: S(t)=exp(−β×(current_time−update_time)/typical_update_interval).

The system tracks when each update was created (update_time) and compares it to now (current_time) to determine often updates typically arrive for each part of the model (typical_update_interval). This is used these to calculate how many "typical intervals" old this update is. For example, if updates usually come every 30 seconds and this update is 90 seconds old, it's 3 intervals old. The exponential function (exp) then converts this age into a discount factor between 0 and 1: fresh updates get values close to 1 (minimal discount) and very old updates get values close to 0 (heavy discount).

The β parameter (between 0.1-0.5) may control how aggressive this discount is. In some examples, early in training: β≈0.1 (gentle discounting of old updates); later in training: β≈0.5 (steep discounting of old updates); this approach means an update that arrives "on schedule" has full impact, while updates that arrive much later have progressively less influence on the model.

The system calculates the weights for each update as:

$$w_i=N(v_i\times e\hat{}(-\lambda\times s_i)\times r_i)$$

Where:

$v_i$ is the validation score (0-1) showing how trustworthy the result is;

$s_i$ is how old the update is;

$r_i$ is the device's reliability score;

λ penalizes staleness (typically 0.1);

N( ) normalizes the weights so they sum to 1.

As the edge devices may not be fully in control of the entity training the machine-learning model, a statistical outlier approach may be used to prevent incorrect results from defective hardware, nefarious actors, or other anomalous results from affecting the learning. The system computes, for each result, an anomaly score given by:

$$\text{Anomaly\_Score}(r)=|r-\mu|/\sigma$$

Where:

r is the result being checked;

μ is the average of valid results;

σ is the standard deviation of valid results.

Results whose anomaly scores are above a threshold (e.g., 3.0) may be flagged as suspicious. In some examples, suspicious results may be excluded from training, or those calculations may be sent to a second device for checking. If the result from the second devices matches the first, those results may be used in the training. If the result from the second devices does not match the first, a third device may be asked to calculate the microtask. The system may use the result that is provided by at least two devices. In addition, returning an anomalous result may reduce the reliability score of the devices, which decreases the weights of those results.

When results conflict about which direction to update a parameter, the system may use a voting mechanism:

$$\text{Vote\_Score}(u)=\Sigma(r_i\times v_i\times \text{sign}(u_i))$$

Where:

$r_i$ is device reliability score (discussed later);

$v_i$ is validation score;

$\text{sign}(u_i)$ is the direction of update (+1 or −1).

The validation score measures a confidence in a result's correctness on a scale from 0 to 1. In some examples, it may be calculated using three subcomponents: 1. Agreement check (e.g., 40% of score): How closely this result matches other devices' results for the same task. If 8 out of 10 devices return similar values, a result matching the majority scores higher. 2. Math check (e.g., 30% of score): measures whether the result obeys expected mathematical properties. For example, gradients should have reasonable magnitudes and certain model updates should preserve specific tensor properties. 3. Range check (e.g., 30% of score): this measures whether values fall within normal boundaries based on historical data. For example, if weight updates for a specific layer typically range from −0.01 to +0.01, a result with updates of magnitude 10.0 would score poorly. These three subscores may be combined into a final validation score. Results scoring above a first threshold (e.g., 0.8) are considered highly reliable, while those below a second threshold (e.g., 0.5) receive significantly reduced influence when updating the model.

In addition, the system may keep track of each device's reputation using a reliability score. The reliability score is a smoothed update mechanism that balances historical performance with recent behavior:

$$\text{Reliability score}(d,t)=0.95\times\text{Rel}(d,t-1)+0.05\times\text{current\_performance}$$

Where:

Rel(d,t) is the device's reputation/reliability score at the current time;

Rel(d,t−1) is the previous reputation score;

current_performance is a binary value (0 or 1) indicating whether the latest task was successful.

As noted previously, successful is determined by one or more of: whether the result agrees with other devices' results for the same task, mathematical correctness of the calculations, and/or values falling within expected ranges.

By weighting the previous score at 95% and the new performance at 5%, we create a system where: A device must consistently perform well to build and maintain a high reliability score, a single failure won't dramatically reduce a previously reliable device's score, and a problematic device must demonstrate good behavior over multiple tasks to restore its reputation. For example, if a device with 0.9 reliability fails a task (current_performance=0), its new score would be: 0.95×0.9+0.05×0=0.855.

This reliability/reputation score is used as the "R" component in the Priority_Score component for task assignment, the "$r_i$" term in the Vote_Score formula for handling conflicting updates, and as a factor in the weighting of results during model parameter updates.

A device's reputation slowly changes based on how consistently it provides correct results. The system thus handles results arriving at random times, some answers being wrong, some devices being unreliable, and the like, yet it still manages to create a coherent training process that converges properly. In some examples, if a device's reputation falls below a specific threshold, the device may no longer receive micro-tasks. In still other examples, the weighting to give to a result produced by each edge device may be based upon, among other things, the reputation of the device.

FIG. 1 shows a machine-learning training and inference system 100 that integrates distributed edge training. This system is designed to leverage the computational power of multiple computing devices 112 and 114, which are connected through a network 116, such as the Internet, to perform machine learning tasks. Computing device 110 is shown as utilizing the inference capabilities of an inference system 122 that uses a model 124 trained using the distributed edge training. In some examples, although not shown, computing device 110 may also participate in the distributed edge training.

The computing devices 112 and 114 are part of the edge training system and receive respective microtask completion requests 134 and 136 from the training service 126, which is responsible for distributing tasks based on the training data 128. The microtasks are small, independent units of work that contribute to the training of a machine-learning model 124. Once the microtasks are completed, the computing devices 112 and 114 send the results 138 and 140 back to the training service 126 via the network 116. While only two microtasks are shown, it will be understood by a person of ordinary skill that additional microtasks may be assigned sequentially, or in-parallel to the computing devices 112 and 114. In some examples, devices, such as computing devices 112 and 114 may register to receive microtasks from the training service 126 prior to being sent microtasks. For example, a user may sign up to having their devices perform the training tasks.

The training service 126 processes the microtask results to update the machine-learning model 124. This model is then used by the inference service 122 to handle inference queries, such as inference query 130. The inference service 122 receives these queries from various sources, including computing device 110, and processes them using the trained model 124 to generate inference responses, such as inference response 132. These responses are then sent back to the querying devices, completing the inference cycle. Inference tasks may include generative tasks such as generating text, images, audio, video, or audio-visual content, or the like; tasks such as generation of signals based upon input data, classification tasks, control-based tasks (e.g., controlling one or more subsystems based upon input data), and the like.

The network 116 serves as the central communication mechanism, facilitating the exchange of microtasks, results, queries, and responses between the edge devices and the centralized services. This architecture allows for efficient utilization of distributed computing resources, enabling scalable and flexible machine learning operations that can adapt to varying computational loads and network conditions.

The training service 126 within the edge training system 100 performs several functions to facilitate distributed machine learning. It decomposes the machine-learning model 124 creating microtasks that can be processed independently. This decomposition allows for parallel training across multiple computing devices, such as computing devices 112 and 114. The training service 126 monitors these devices, assessing GPU availability and device reliability to optimize task assignment. Based on this monitoring, it assigns microtasks to the devices, ensuring efficient use of resources. To maintain computation integrity, the training service 126 employs Byzantine-resistant validation methods, verifying the results returned from the edge devices 138 and 140 through a multi-layer validation framework. Once validated, these results are integrated back into the machine-learning model 124, refining its accuracy and performance. This approach ensures robust model convergence while leveraging the distributed computational power of edge devices.

Figure 2:
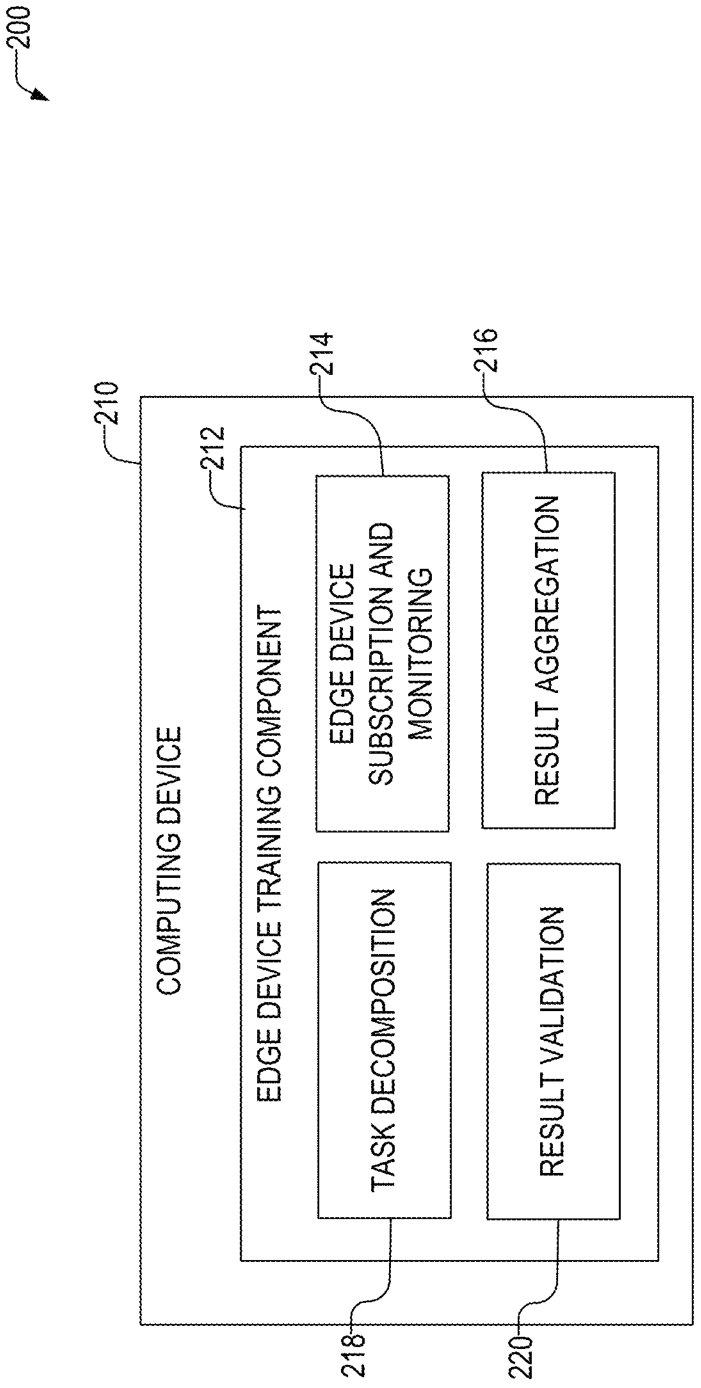
FIG. 2 illustrates a computing device that includes an edge device training component, according to some examples of the present disclosure.

FIG. 2 illustrates a computing device 210 that includes an edge device training component 212 according to some examples of the present disclosure. This component may be utilized by training service 126 to enable distributed machine learning by utilizing the computational capabilities of edge devices. The edge device training component 212 is composed of several sub-components, each serving a distinct function within the system.

The task decomposition component 218 is responsible for breaking down machine learning models into smaller, independently trainable micro-tasks. This process may utilize two complementary approaches: layer-wise partitioning and gradient-based decomposition. Layer-wise partitioning analyzes the neural network's natural computational boundaries and structure, identifying optimal points to split the computation while maintaining mathematical correctness. Gradient-based decomposition focuses on partitioning gradient computations into independent components that can be processed separately, allowing for asynchronous processing while maintaining training convergence guarantees.

The edge device subscription and monitoring component 214 tracks the availability and performance metrics of connected edge devices to identify devices with processing capacity. Edge devices that have processing capacity may be selected by the device subscription and monitoring component to receive one or more microtasks created by the task decomposition component 218. In some examples, multiple of a same micro-task may be assigned to multiple edge computing devices. Edge device subscription and monitoring component 214 may enroll edge devices into the system to register them for assignment of microtasks.

The result validation component 220 ensures computation integrity by utilizing multiple independent verifications before accepting any computation result. This component combines cryptographic validation, statistical analysis, and consensus mechanisms to maintain reliable training progress, even when utilizing untrusted edge devices.

The result aggregation component 216 is responsible for combining validated results through sophisticated weighted averaging and momentum tracking mechanisms. This component maintains model convergence despite the irregular nature of updates from edge devices, ensuring that the distributed training process remains stable and effective. The result aggregation component handles asynchronous updates and implements adaptive learning rate scheduling to accommodate the dynamic contributions from edge devices.

Figure 3:
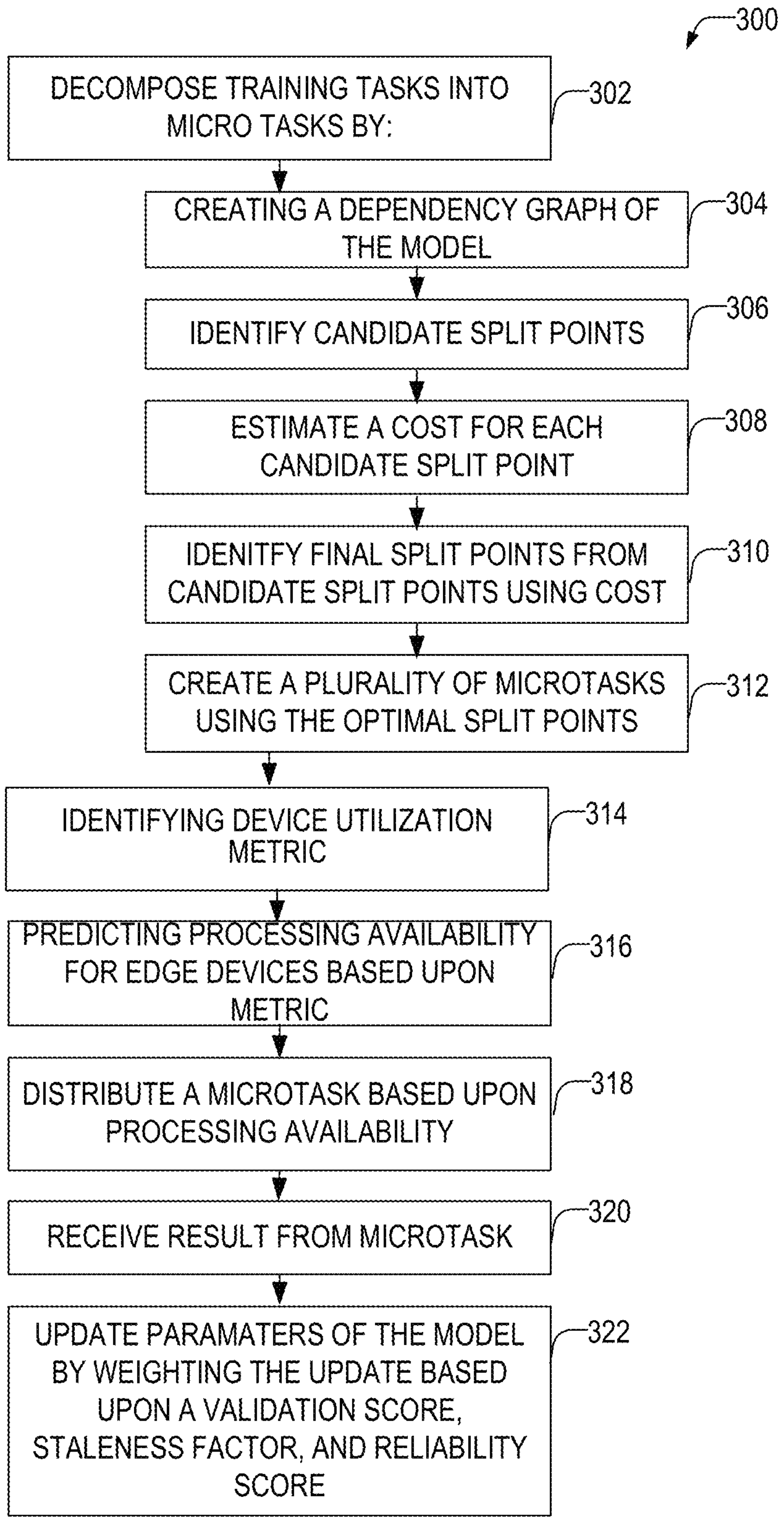
FIG. 3 illustrates a flowchart of a method of opportunistic edge training of a machine-learning model, according to some examples of the present disclosure.

FIG. 3 illustrates a flowchart of a method 300 of leveraging processing capacity on edge devices to train a machine-learning model according to some examples of the present disclosure. At operation 302, the system decomposes training tasks into micro-tasks by the operations of 304-312. At operation 304, the system creates a dependency graph showing computational dependencies between model components. The dependency graph represents relationships between variables, features, or internal components where nodes represent variables, features, data points, or internal model components such as neurons or layers. The dependency graph describes calculation dependencies between layers of the model. At operation 306, the system identifies candidate model split points based on the dependency graph, ensuring calculations within each split point are not dependent on other calculations within the same split point.

At operation 308, the system estimates a split cost score for each candidate model split point. For example, using the formula $\lambda\_cost(p)=c\times C\_comm(p)+m\times M\_overhead(p)+d\times D\_locality(p)$, where $C\_comm(p)$ represents communication costs, $M\_overhead(p)$ represents memory overhead, and $D\_locality(p)$ represents data locality. In some examples, the system verifies splits maintain model behavior by ensuring $|F(x)-F'(x)|2\leq 0.000001$.

At operation 310, the system identifies final model split points from the candidate model split points based upon the cost. For example, by selecting a set of model split points that represent a lowest cost. At operation 312, the system may create a plurality of micro-tasks based upon the training task calculations corresponding to the final model split points.

At operation 314, the system may identify utilization metrics of a plurality of devices by monitoring metrics such as GPU utilization percentage, memory usage, temperature, and power consumption. The sampling rate may be adjusted according to the device metrics to ensure that the sampling operation does not impact device performance and user experience.

At operation 316 the system predicts processing availability for edge devices based on the device utilization metrics using a combination of neural network predictions based on historical patterns, Bayesian probabilistic forecasts, and statistical long-term trend analysis. For example, according to $P(t)=0.6\times LSTM(H)+0.3\times Bayesian(R)+0.1\times Statistical(T)$.

At operation 318, responsive to predicting processing availability, the system distributes micro-tasks to edge devices. For example, by transmitting the micro-task to an edge device over a network. In some examples, prior to distributing the tasks, a task size may be adjusted based upon device availability unpredictability and device capability factors.

At operation 320, the system receives computation results from the edge devices. Results may include cryptographic signatures and validation proofs. At operation 322, the system updates the machine learning model parameters using the received results. The update may be weighted based on: (i) a validation score determined by comparing results against other results for the same task, (ii) a staleness factor calculated and (iii) a device reliability score computed as a ratio of successfully validated tasks to total assigned tasks.

Figure 4:
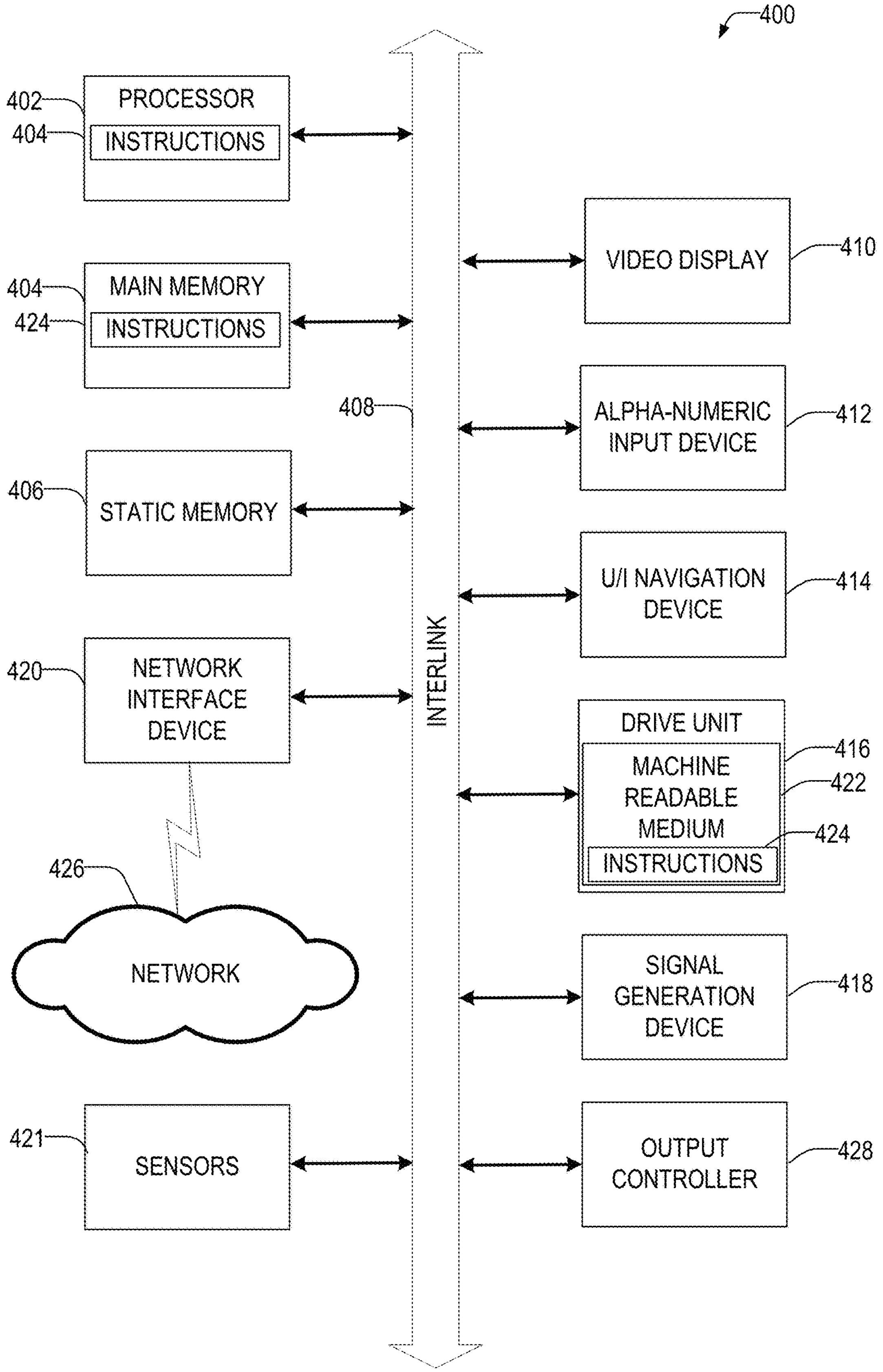
FIG. 4 illustrates a block diagram of an example machine upon which any one or more of the techniques discussed herein may be performed, according to some examples of the present disclosure.

FIG. 4 illustrates a block diagram of an example machine 400 upon which any one or more of the techniques (e.g., methodologies) discussed herein may be performed. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be in the form of a server, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Machine 400 may be configured to be any of the devices in FIG. 1, to include the components of FIG. 2, or to perform the method of FIG. 3.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 400 may include one or more hardware processors, such as processor 402. Processor 402 may be a central processing unit (CPU), a graphics processing unit (GPU), a hardware processor core, or any combination thereof. Machine 400 may include a main memory 404 and a static memory 406, some or all of which may communicate with each other via an interlink (e.g., bus) 408. Examples of main memory 404 may include Synchronous Dynamic Random-Access Memory (SDRAM), such as Double Data Rate memory, such as DDR4 or DDR5. Interlink 408 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 424 may further be transmitted or received over a communications network 426 using a transmission medium via the network interface device 420. The Machine 400 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. In some examples, the network interface device 420 may wirelessly communicate using Multiple User MIMO techniques.

Other Notes and Examples

Example 1 is a method for leveraging processing capacity on computing devices to train a machine-learning model, the method comprising: decomposing training tasks for the machine-learning model into independently trainable micro-tasks by: creating a dependency graph of the machine-learning model showing computational dependencies between model components; identifying candidate model split points based upon the dependency graph, wherein training task calculations within each model split point are not dependent on other calculations within a same split point; calculating a split cost score for each candidate model split point based upon a weighted combination of: a communication cost determined by estimating a total amount of data to be transferred between devices if the training task calculations are split at the candidate model split point; a memory overhead cost determined by estimating an additional amount of memory required to store temporary results and model outputs if the training task calculations are split at the candidate model split point beyond what would be needed during non-split operation; and a data locality cost determined by estimating how frequently a device would need to access data that is not stored locally if the training task calculations are split at the candidate model split point; selecting final model split points from the candidate model split points based on lowest split cost scores; and generating a plurality of micro-tasks based on the training task calculations corresponding to the final model split points; distributing a first micro-task of the plurality of micro-tasks to a first computing device of a plurality of computing devices; receiving a computation result of the first micro-task from the first computing device; and responsive to the computation result of the first micro-task, updating parameters of the machine-learning model using the computation result, wherein the update is weighted based upon one or more of: (i) a validation score determined by a comparison of the computation result against other results for a same task, (ii) a staleness factor that lowers scores as time elapses since the one of the plurality of micro-tasks was initiated, or (iii) a device reliability score of the first computing device computed as a ratio of successfully validated tasks to total assigned tasks for the first computing device over a defined time period.

In Example 2, the subject matter of Example 1 includes, identifying a device utilization metric for the plurality of computing devices; predicting processing availability for one of the plurality of computing devices based upon the device utilization metric; and wherein distributing the first micro-task to the first computing device is responsive to predicting processing availability of the first computing device.

In Example 3, the subject matter of Example 2 includes, wherein the device utilization metrics comprise a GPU utilization percentage, a memory usage, a device temperature, a power consumption, and wherein the method further comprises adjusting a sampling rate for collecting the device utilization metrics based on current GPU utilization and temperature.

In Example 4, the subject matter of Examples 2-3 includes, wherein predicting processing availability comprises calculating a prediction score as a weighted combination of a neural network prediction based on historical usage patterns, a Bayesian probabilistic forecast, and a statistical long-term trend analysis.

In Example 5, the subject matter of Examples 1-4 includes, wherein creating the dependency graph of the machine-learning model showing computational dependencies between model components further comprise: identifying a plurality of model components, each corresponding to a computational layer within the machine-learning model; determining, for each model component, one or more input dependencies and one or more output dependencies based on computational requirements; generating nodes in the dependency graph corresponding to the identified plurality of model components; and generating directed edges between nodes in the dependency graph to represent the computational dependencies between the corresponding model components, such that an edge from a first node to a second node indicates that an output of the first node is used as an input to the second node.

In Example 6, the subject matter of Examples 1-5 includes, adjusting a size of the first micro-task based on processing capabilities of the first computing device.

In Example 7, the subject matter of Examples 1-6 includes, wherein the device reliability score is calculated using an exponentially weighted moving average that assigns a first score for successful task validation, and assigns a second score for failed or incorrect results, and weights recent performance more heavily than historical performance.

Example 8 is a computing device for leveraging processing capacity on computing devices to train a machine-learning model, the computing device comprising: a hardware processor; a memory, the memory storing instructions, which when executed by the hardware processor cause the computing device to perform operations comprising: decomposing training tasks for the machine-learning model into independently trainable micro-tasks by: creating a dependency graph of the machine-learning model showing computational dependencies between model components; identifying candidate model split points based upon the dependency graph, wherein training task calculations within each model split point are not dependent on other calculations within a same split point; calculating a split cost score for each candidate model split point based upon a weighted combination of: a communication cost determined by estimating a total amount of data to be transferred between devices if the training task calculations are split at the candidate model split point; a memory overhead cost determined by estimating an additional amount of memory required to store temporary results and model outputs if the training task calculations are split at the candidate model split point beyond what would be needed during non-split operation; and a data locality cost determined by estimating how frequently a device would need to access data that is not stored locally if the training task calculations are split at the candidate model split point; selecting final model split points from the candidate model split points based on lowest split cost scores; and generating a plurality of micro-tasks based on the training task calculations corresponding to the final model split points; distributing a first micro-task of the plurality of micro-tasks to a first computing device of a plurality of computing devices; receiving a computation result of the first micro-task from the first computing device; and responsive to the computation result of the first micro-task, updating parameters of the machine-learning model using the computation result, wherein the update is weighted based upon one or more of: (i) a validation score determined by a comparison of the computation result against other results for a same task, (ii) a staleness factor that lowers scores as time elapses since the one of the plurality of micro-tasks was initiated, or (iii) a device reliability score of the first computing device computed as a ratio of successfully validated tasks to total assigned tasks for the first computing device over a defined time period.

In Example 9, the subject matter of Example 8 includes, wherein the operations further comprise: identifying a device utilization metric for the plurality of computing devices; predicting processing availability for one of the plurality of computing devices based upon the device utilization metric; and wherein the operation of distributing the first micro-task to the first computing device is responsive to predicting processing availability of the first computing device.

In Example 10, the subject matter of Example 9 includes, wherein the device utilization metrics comprise a GPU utilization percentage, a memory usage, a device temperature, and a power consumption, and wherein the operations further comprise: adjusting a sampling rate for collecting the device utilization metrics based on current GPU utilization and temperature.

In Example 11, the subject matter of Examples 9-10 includes, wherein the operation of predicting processing availability comprises: calculating a prediction score as a weighted combination of a neural network prediction based on historical usage patterns, a Bayesian probabilistic forecast, and a statistical long-term trend analysis.

In Example 12, the subject matter of Examples 8-11 includes, wherein the operation of creating the dependency graph of the machine-learning model showing computational dependencies between model components further comprises: identifying a plurality of model components, each corresponding to a computational layer within the machine-learning model; determining, for each model component, one or more input dependencies and one or more output dependencies based on computational requirements; generating nodes in the dependency graph corresponding to the identified plurality of model components; and generating directed edges between nodes in the dependency graph to represent the computational dependencies between the corresponding model components, such that an edge from a first node to a second node indicates that an output of the first node is used as an input to the second node.

In Example 13, the subject matter of Examples 8-12 includes, wherein the operations further comprise: adjusting a size of the first micro-task based on processing capabilities of the first computing device.

In Example 14, the subject matter of Examples 8-13 includes, wherein the operation of calculating the device reliability score comprises: using an exponentially weighted moving average that assigns a first score for successful task validation, and assigns a second score for failed or incorrect results, and weights recent performance more heavily than historical performance.

Example 15 is a non-transitory machine-readable medium, storing instructions for leveraging processing capacity on computing devices to train a machine-learning model, the instructions, which when executed, cause the machine to perform operations comprising: decomposing training tasks for the machine-learning model into independently trainable micro-tasks by: creating a dependency graph of the machine-learning model showing computational dependencies between model components; identifying candidate model split points based upon the dependency graph, wherein training task calculations within each model split point are not dependent on other calculations within a same split point; calculating a split cost score for each candidate model split point based upon a weighted combination of: a communication cost determined by estimating a total amount of data to be transferred between devices if the training task calculations are split at the candidate model split point; a memory overhead cost determined by estimating an additional amount of memory required to store temporary results and model outputs if the training task calculations are split at the candidate model split point beyond what would be needed during non-split operation; and a data locality cost determined by estimating how frequently a device would need to access data that is not stored locally if the training task calculations are split at the candidate model split point; selecting final model split points from the candidate model split points based on lowest split cost scores; and generating a plurality of micro-tasks based on the training task calculations corresponding to the final model split points; distributing a first micro-task of the plurality of micro-tasks to a first computing device of a plurality of computing devices; receiving a computation result of the first micro-task from the first computing device; and responsive to the computation result of the first micro-task, updating parameters of the machine-learning model using the computation result, wherein the update is weighted based upon one or more of: (i) a validation score determined by a comparison of the computation result against other results for a same task, (ii) a staleness factor that lowers scores as time elapses since the one of the plurality of micro-tasks was initiated, or (iii) a device reliability score of the first computing device computed as a ratio of successfully validated tasks to total assigned tasks for the first computing device over a defined time period.

In Example 16, the subject matter of Example 15 includes, wherein the operations further comprise: identifying a device utilization metric for the plurality of computing devices; predicting processing availability for one of the plurality of computing devices based upon the device utilization metric; and wherein the operation of distributing the first micro-task to the first computing device is responsive to predicting processing availability of the first computing device.

In Example 17, the subject matter of Example 16 includes, wherein the device utilization metrics comprise a GPU utilization percentage, a memory usage, a device temperature, and a power consumption, and wherein the operations further comprise: adjusting a sampling rate for collecting the device utilization metrics based on current GPU utilization and temperature.

In Example 18, the subject matter of Examples 16-17 includes, wherein the operation of predicting processing availability comprises: calculating a prediction score as a weighted combination of a neural network prediction based on historical usage patterns, a Bayesian probabilistic forecast, and a statistical long-term trend analysis.

In Example 19, the subject matter of Examples 15-18 includes, wherein the operation of creating the dependency graph of the machine-learning model showing computational dependencies between model components further comprises: identifying a plurality of model components, each corresponding to a computational layer within the machine-learning model; determining, for each model component, one or more input dependencies and one or more output dependencies based on computational requirements; generating nodes in the dependency graph corresponding to the identified plurality of model components; and generating directed edges between nodes in the dependency graph to represent the computational dependencies between the corresponding model components, such that an edge from a first node to a second node indicates that an output of the first node is used as an input to the second node.

In Example 20, the subject matter of Examples 15-19 includes, wherein the operations further comprise: adjusting a size of the first micro-task based on processing capabilities of the first computing device.

In Example 21, the subject matter of Examples 15-20 includes, wherein the operation of calculating the device reliability score comprises: using an exponentially weighted moving average that assigns a first score for successful task validation, and assigns a second score for failed or incorrect results, and weights recent performance more heavily than historical performance.

Example 22 is at least one machine-readable medium including instructions that, when executed by processing circuitry, cause the processing circuitry to perform operations to implement of any of Examples 1-21.

Example 23 is an apparatus comprising means to implement of any of Examples 1-21.

Example 24 is a system to implement of any of Examples 1-21.

Example 25 is a method to implement of any of Examples 1-21.

What is claimed is:

1. A method for leveraging processing capacity on computing devices to train a machine-learning model, the method comprising:

decomposing training tasks for the machine-learning model into independently trainable micro-tasks by:

creating a dependency graph of the machine-learning model showing computational dependencies between model components;

identifying candidate model split points based upon the dependency graph, wherein training task calculations within each model split point are not dependent on other calculations within a same split point;

calculating a split cost score for each candidate model split point based upon a weighted combination of:

a communication cost determined by estimating a total amount of data to be transferred between devices if the training task calculations are split at the candidate model split point;

a memory overhead cost determined by estimating an additional amount of memory required to store temporary results and model outputs if the training task calculations are split at the candidate model split point beyond what would be needed during non-split operation; and a data locality cost determined by estimating how frequently a device would need to access data that is not stored locally if the training task calculations are split at the candidate model split point;

selecting final model split points from the candidate model split points based on lowest split cost scores; and generating a plurality of micro-tasks based on the training task calculations corresponding to the final model split points;

distributing a first micro-task of the plurality of micro-tasks to a first computing device of a plurality of computing devices;

receiving a computation result of the first micro-task from the first computing device; and responsive to the computation result of the first micro-task, updating parameters of the machine-learning model using the computation result, wherein the update is weighted based upon one or more of:

(i) a validation score determined by a comparison of the computation result against other results for a same task, (ii) a staleness factor that lowers scores as time elapses since the one of the plurality of micro-tasks was initiated, or (iii) a device reliability score of the first computing device computed as a ratio of successfully validated tasks to total assigned tasks for the first computing device over a defined time period.

2. The method of claim 1, further comprising:

identifying a device utilization metric for the plurality of computing devices;

predicting processing availability for one of the plurality of computing devices based upon the device utilization metric; and wherein distributing the first micro-task to the first computing device is responsive to predicting processing availability of the first computing device.

3. The method of claim 2, wherein the device utilization metrics comprise a GPU utilization percentage, a memory usage, a device temperature, a power consumption, and wherein the method further comprises adjusting a sampling rate for collecting the device utilization metrics based on current GPU utilization and temperature.

4. The method of claim 2, wherein predicting processing availability comprises calculating a prediction score as a weighted combination of a neural network prediction based on historical usage patterns, a Bayesian probabilistic forecast, and a statistical long-term trend analysis.

5. The method of claim 1, wherein creating the dependency graph of the machine-learning model showing computational dependencies between model components further comprise:

identifying a plurality of model components, each corresponding to a computational layer within the machine-learning model;

determining, for each model component, one or more input dependencies and one or more output dependencies based on computational requirements;

generating nodes in the dependency graph corresponding to the identified plurality of model components; and generating directed edges between nodes in the dependency graph to represent computational dependencies between the corresponding model components, such that an edge from a first node to a second node indicates that an output of the first node is used as an input to the second node.

6. The method of claim 1, further comprising adjusting a size of the first micro-task based on processing capabilities of the first computing device.

7. The method of claim 1, wherein the device reliability score is calculated using an exponentially weighted moving average that assigns a first score for successful task validation, and assigns a second score for failed or incorrect results, and weights recent performance more heavily than historical performance.

8. A computing device for leveraging processing capacity on computing devices to train a machine-learning model, the computing device comprising:

a hardware processor;

a memory, the memory storing instructions, which when executed by the hardware processor cause the computing device to perform operations comprising:

decomposing training tasks for the machine-learning model into independently trainable micro-tasks by:

creating a dependency graph of the machine-learning model showing computational dependencies between model components;

identifying candidate model split points based upon the dependency graph, wherein training task calculations within each model split point are not dependent on other calculations within a same split point;

calculating a split cost score for each candidate model split point based upon a weighted combination of:

a communication cost determined by estimating a total amount of data to be transferred between devices if the training task calculations are split at the candidate model split point;

a memory overhead cost determined by estimating an additional amount of memory required to store temporary results and model outputs if the training task calculations are split at the candidate model split point beyond what would be needed during non-split operation; and a data locality cost determined by estimating how frequently a device would need to access data that is not stored locally if the training task calculations are split at the candidate model split point;

selecting final model split points from the candidate model split points based on lowest split cost scores; and generating a plurality of micro-tasks based on the training task calculations corresponding to the final model split points;

distributing a first micro-task of the plurality of micro-tasks to a first computing device of a plurality of computing devices;

receiving a computation result of the first micro-task from the first computing device; and responsive to the computation result of the first micro-task, updating parameters of the machine-learning model using the computation result, wherein the update is weighted based upon one or more of:

(i) a validation score determined by a comparison of the computation result against other results for a same task, (ii) a staleness factor that lowers scores as time elapses since the one of the plurality of micro-tasks was initiated, or (iii) a device reliability score of the first computing device computed as a ratio of successfully validated tasks to total assigned tasks for the first computing device over a defined time period.

9. The computing device of claim 8, wherein the operations further comprise:

identifying a device utilization metric for the plurality of computing devices;

predicting processing availability for one of the plurality of computing devices based upon the device utilization metric; and wherein the operation of distributing the first micro-task to the first computing device is responsive to predicting processing availability of the first computing device.

10. The computing device of claim 9, wherein the device utilization metrics comprise a GPU utilization percentage, a memory usage, a device temperature, and a power consumption, and wherein the operations further comprise:

adjusting a sampling rate for collecting the device utilization metrics based on current GPU utilization and temperature.

11. The computing device of claim 9, wherein the operation of predicting processing availability comprises:

calculating a prediction score as a weighted combination of a neural network prediction based on historical usage patterns, a Bayesian probabilistic forecast, and a statistical long-term trend analysis.

12. The computing device of claim 8, wherein the operation of creating the dependency graph of the machine-learning model showing computational dependencies between model components further comprises:

identifying a plurality of model components, each corresponding to a computational layer within the machine-learning model;

determining, for each model component, one or more input dependencies and one or more output dependencies based on computational requirements;

generating nodes in the dependency graph corresponding to the identified plurality of model components; and generating directed edges between nodes in the dependency graph to represent computational dependencies between the corresponding model components, such that an edge from a first node to a second node indicates that an output of the first node is used as an input to the second node.

13. The computing device of claim 8, wherein the operations further comprise:

adjusting a size of the first micro-task based on processing capabilities of the first computing device.

14. The computing device of claim 8, wherein the operation of calculating the device reliability score comprises:

using an exponentially weighted moving average that assigns a first score for successful task validation, and assigns a second score for failed or incorrect results, and weights recent performance more heavily than historical performance.

15. A non-transitory machine-readable medium, storing instructions for leveraging processing capacity on computing devices to train a machine-learning model, the instructions, which when executed, cause a machine to perform operations comprising:

decomposing training tasks for the machine-learning model into independently trainable micro-tasks by:

creating a dependency graph of the machine-learning model showing computational dependencies between model components;

identifying candidate model split points based upon the dependency graph, wherein training task calculations within each model split point are not dependent on other calculations within a same split point;

calculating a split cost score for each candidate model split point based upon a weighted combination of:

a communication cost determined by estimating a total amount of data to be transferred between devices if the training task calculations are split at the candidate model split point;

a memory overhead cost determined by estimating an additional amount of memory required to store temporary results and model outputs if the training task calculations are split at the candidate model split point beyond what would be needed during non-split operation; and a data locality cost determined by estimating how frequently a device would need to access data that is not stored locally if the training task calculations are split at the candidate model split point;

selecting final model split points from the candidate model split points based on lowest split cost scores; and generating a plurality of micro-tasks based on the training task calculations corresponding to the final model split points;

distributing a first micro-task of the plurality of micro-tasks to a first computing device of a plurality of computing devices;

receiving a computation result of the first micro-task from the first computing device; and responsive to the computation result of the first micro-task, updating parameters of the machine-learning model using the computation result, wherein the update is weighted based upon one or more of:

(i) a validation score determined by a comparison of the computation result against other results for a same task, (ii) a staleness factor that lowers scores as time elapses since the one of the plurality of micro-tasks was initiated, or (iii) a device reliability score of the first computing device computed as a ratio of successfully validated tasks to total assigned tasks for the first computing device over a defined time period.

16. The non-transitory machine-readable medium of claim 15, wherein the operations further comprise:

identifying a device utilization metric for the plurality of computing devices;

predicting processing availability for one of the plurality of computing devices based upon the device utilization metric; and wherein the operation of distributing the first micro-task to the first computing device is responsive to predicting processing availability of the first computing device.

17. The non-transitory machine-readable medium of claim 16, wherein the device utilization metrics comprise a GPU utilization percentage, a memory usage, a device temperature, and a power consumption, and wherein the operations further comprise:

adjusting a sampling rate for collecting the device utilization metrics based on current GPU utilization and temperature.

18. The non-transitory machine-readable medium of claim 16, wherein the operation of predicting processing availability comprises:

calculating a prediction score as a weighted combination of a neural network prediction based on historical usage patterns, a Bayesian probabilistic forecast, and a statistical long-term trend analysis.

19. The non-transitory machine-readable medium of claim 15, wherein the operation of creating the dependency graph of the machine-learning model showing computational dependencies between model components further comprises:

identifying a plurality of model components, each corresponding to a computational layer within the machine-learning model;

determining, for each model component, one or more input dependencies and one or more output dependencies based on computational requirements;

generating nodes in the dependency graph corresponding to the identified plurality of model components; and generating directed edges between nodes in the dependency graph to represent computational dependencies between the corresponding model components, such that an edge from a first node to a second node indicates that an output of the first node is used as an input to the second node.

20. The non-transitory machine-readable medium of claim 15, wherein the operations further comprise:

adjusting a size of the first micro-task based on processing capabilities of the first computing device.

* * * * *